2 Sheets—Sheet 1.
J. E. LEWIS.
CORN SHELLER.
No. 178,536. Patented June 13, 1876.
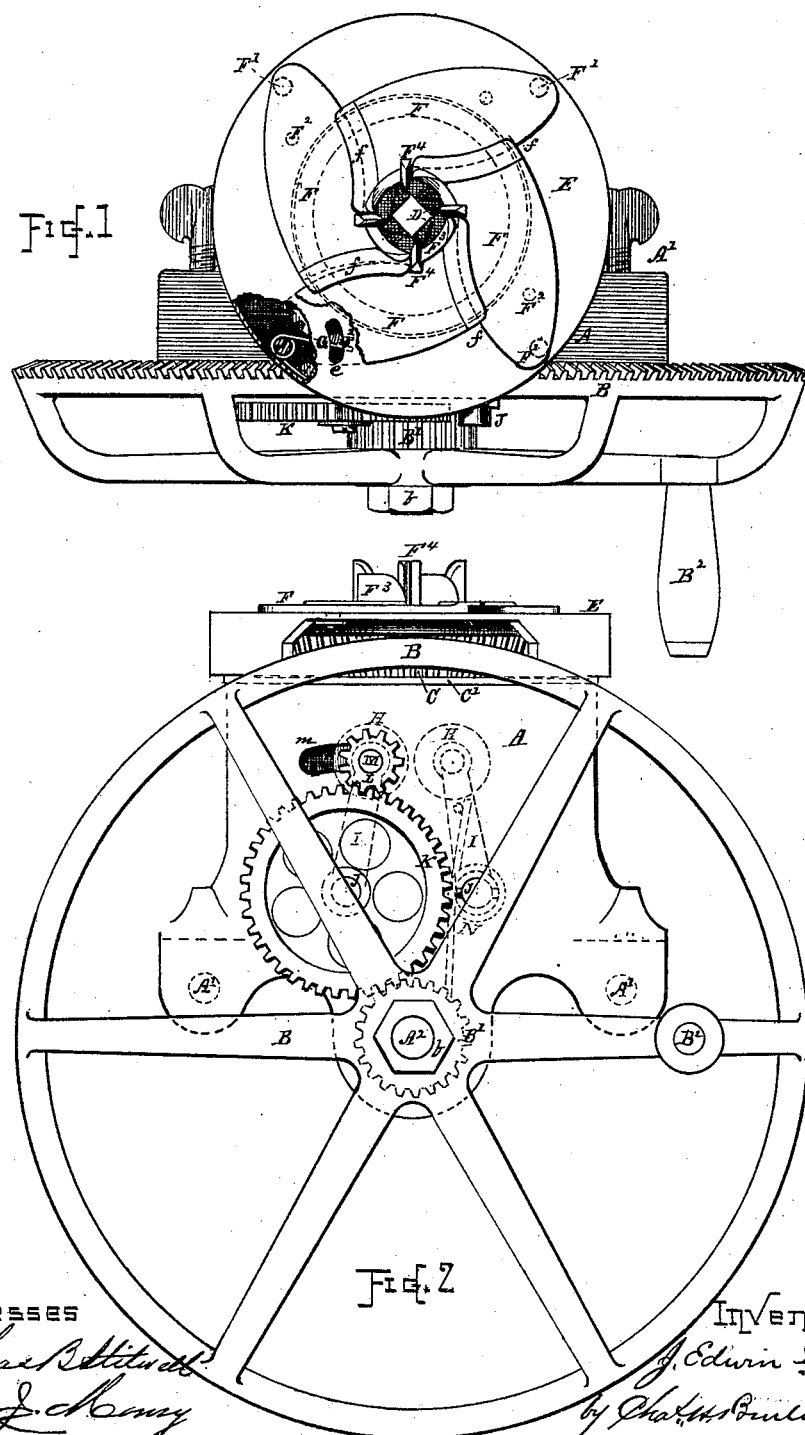

2 Sheets—Sheet 2.
J. E. LEWIS.
CORN SHELLER.
No. 178,536. Patented June 13, 1876.
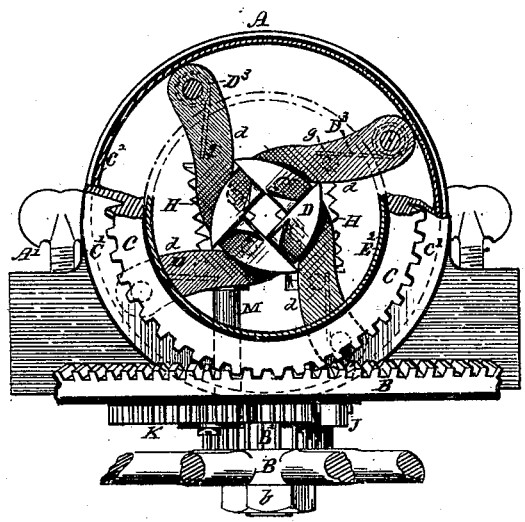
Fig. 3
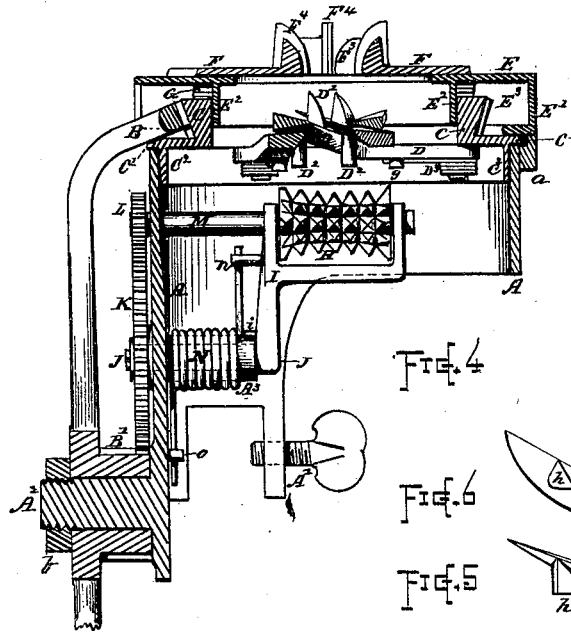
Fig. 4
Fig. 6
Fig. 5
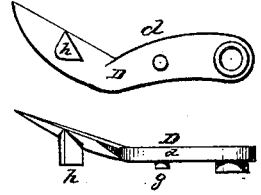
Witnesses
Chas. B. Stilwell
Geo. J. Harry
Inventor
J. Edwin Lewis
by Chas. H. Burleigh
Atty.

UNITED STATES PATENT OFFICE.

J. EDWIN LEWIS, OF WORCESTER, MASSACHUSETTS.

IMPROVEMENT IN CORN-SHELLERS.

Specification forming part of Letters Patent No. 178,536, dated June 13, 1876; application filed April 8, 1876.

*To all whom it may concern:*

Be it known that I, J. EDWIN LEWIS, of the city and county of Worcester and State of Massachusetts, have invented certain new and useful Improvements in Machines for Shelling Corn and for Cutting Green Corn from the Cob; and I hereby declare the following to be a description of my invention sufficiently full, clear, and exact to enable others skilled in the art to which it appertains to make and use the same, reference being had to the accompanying drawings, which form a part of this specification, and in which—

Figure 1 represents a plan view of my improved corn-sheller. Fig. 2 represents a front view of the same. Fig. 3 represents a horizontal sectional view below the cap-plate. Fig. 4 represents a vertical sectional view through the center. Fig. 5 represents a side view of one of the shelling-arms, as made for use in cutting green corn from the cob. Fig. 6 represents a bottom view of the shelling-arm as made for cutting green corn from the cob.

This invention relates to that class of machines for shelling or cutting corn from the cob wherein the ear of corn is guided centrally downward between a series of shelling or cutting arms operating within a rotating gear or ring, and beneath which a pair of feeding-rolls act to draw the cob from the cutters or shellers.

The object of my invention is to produce a more perfect working machine, and to obviate certain objections incident to those machines heretofore in use.

My invention consists in certain improvements in the construction of the machine, and in the peculiar combination of the various parts of the guiding, shelling, and operating mechanism, as will be hereinafter explained.

The subject-matter claimed is hereafter definitely specified.

In the drawings, A denotes the supporting-frame, the upper part thereof being made in cylindrical form, while the lower part is provided with suitable ear-pieces and clamp-screws, $A^1$, for securing the machine to the side of the box or other receptacle into which the corn is deposited as it falls from the sheller. B indicates the driving gear-wheel, which is supported to turn on a stud, $A^2$, projecting outward from the lower part of the frame A. Stud $A^2$ may be cast with the frame, or otherwise firmly secured thereto. The hub of the driving-gear B, where it extends back from the spokes to the outer side of the frame A, is provided with teeth to form the pinion $B^1$, from which the feeding devices are operated, as hereinafter described. $B^2$ indicates the hand-crank, secured in a boss formed on one of the spokes of the gear B, and $b$ denotes the nut by which said gear is confined on its supporting-stud $A^2$. C indicates the gear-ring which carries the shelling or cutting arms D. Said gear C is made with a horizontal annular flange, $C^1$, at its lower part, which rests upon the top edge of the frame A, and with a downward-projecting flange, $C^2$, which fits into the interior of the cylindrical top of said frame. These flanges $C^1$ and $C^2$ serve to support the shelling mechanism and form the guide-bearings of the gear-ring C, the revolving movement being imparted thereto by the driving-gear B, the teeth of which mesh with the teeth of gear C, as indicated, at its extreme upper part, and above the ends of the shellers D, thus permitting the use of a driving-gear of large diameter without increasing the other proportions of the machine.

E indicates a cap piece arranged to cover the gear C and top of the frame A, where it is supported on lugs $a$, projecting from the sides of said frame. The outer edge or rim $E^1$ of the cap fits closely down to the flange $C^1$ of the ring-gear, and retains the latter in place, while a rim or flange, $E^2$, is also provided on the under side of the cap-plate, which passes down into the central opening of the ring-gear C, making a close joint with its inner surface. (See Figs. 3 and 4.) The outer and inner rims $E^1$ and $E^2$ of the cap thus form, with the top plate E and annular flange $C^1$, a close chamber, $E^3$, within which the gear-teeth and other mechanism are protected from the flying corn or chaff thrown off by the shellers. The opening for the driving-gear B is formed through the rim $E^1$ from the exterior to the chamber $E^3$, as shown. Above the cap-plate E, and covering its central opening, I arrange a series of expansible ear-centering guides or arms, F, of peculiar construction and operation. Said arms F are formed with curved convex sides at $f$, and are pivoted at their outer ends $F^1$ to the cap-plate E, in such manner that the inner end of each arm F will rest against the curved convex edge $f$ of the next adjoining arm, and they are so arranged that any outward pressure tending to swing one of the arms will, by the action of the ends of the arms against the convex edges $f$, cause a uniform and simultaneous outward movement of all the arms, and vice versa; by which movement the center of the expanding and contracting mouth or opening is maintained at a central position in relation to the cap-plate. The arms F are provided with pins or studs $F^2$ on their under sides, that pass down through slots $e$ in the top plate, and against which the compressing-springs G operate. The springs G are of wire coiled around the arm pivot-studs $F^1$, with their ends resting against the pins $F^2$ and rim $E^1$ of the cap, as shown in Fig. 1, wherein a portion of the plate and arm is shown removed to reveal the construction beneath. At their inner ends the arms F are provided with upwardly-projecting flanges $F^3$, which embrace the ear of corn, and with vertical ribs $F^4$, which traverse between the rows of kernels and prevent the ear from revolving.

By reason of the uniform expansion and contaction of the guides F the ear of corn is in all cases guided centrally and direct to the central opening between the shelling-arms D, so as to pass straight through the machine without liability of crowding toward one side, thus rendering the operation of the machine sure and easy.

The shelling-arms D are made in the form shown in Fig. 3. Said arms are pivoted at their rear ends directly to the ring-gear C or its flange $C^1$. The inner ends of the arms cross each other, and are inclined upward, their inner sides being made knife-edged, whereby they act spirally or as a screw, to draw the ear downward through the machine, while the kernels are thrown off by the upward-projecting edged points $D^1$.

The arms D I make with curved convex sides at $d$, and each arm is provided with a downward projection or stud, $D^2$, which works against the curved convex edge $d$ of the adjoining arm. The several studs and curves cause the simultaneous and uniform movement of all the shelling-arms outward and inward from a common center.

The springs $D^3$, for forcing inward the arms D, are coiled around the bearings at the pivots of the respective arms, and extend along the under side thereof to pins or studs $g$, against which they exert their force. The pivots which hold the arms may be supported by ears extending out from the flange $C^2$, or they may take their support wholly at the under side of the ring-gear C. By this arrangement the springs are protected by the arms from being clogged with corn or chaff, and there is no part of the mechanism whereon any kernels can lodge and injuriously affect the proper action of the parts.

For cutting or removing green corn from the cob I make the arms, as shown in Figs. 6 and 7, with scraping blades or lugs $h$ at their under sides. The inner edges of the arms and lugs are sharpened, so that as the arms pass around the ear they will split the kernels, while the lugs following below will scrape out the pulp, leaving the hulls on the cob. The lugs $h$ can, if preferred, be made to cut the kernels free from the cob.

H H indicate the feed-rolls for drawing the cobs away from the sheller-arms D. Said rolls may be of the ordinary form, spiked or otherwise, as desired. Their supporting and operating devices I construct and arrange as follows: Arms I, as shown in Fig. 4, support the ends of the rolls H. These arms extend upward from the ends of short shafts or journals J, which pass through hollow studs or bearings $A^3$ on the inner side of the frame A, said journals J projecting at the outside of the frame, as shown. Lugs or pins $i$ on the arms I fit into notches or recesses in the ends of the bearing $A^3$, and limit the movement or swing of the arms I.

A gear-wheel, K, is hung to turn loosely upon one of the journals J at the outside of the frame A. Said gear-wheel K meshes with the pinion $B^1$ of the driving-gear, and also with a pinion, L, fixed to the end of shaft M, upon which latter shaft one of the feed-rolls is secured. The shaft M is arranged to pass through a curved slot, $m$, in the side of frame A, in the manner illustrated, to allow it to move outward. The gearing is thus placed entirely upon the exterior of the frame A.

The springs N, which give pressure to the feed-rolls H, are coiled around the bearing-studs $A^3$, in which the arm-journals J are supported, and said springs are strained against pins $n$, fixed in the arms I, and pins or lugs $o$ on the frame.

By this construction and combination of parts the interior of the machine is left free and open, with no place where corn and chaff can become lodged. The gears are placed where they will work free and clean, and all parts of the mechanism are rendered strong and serviceable, while they operate with ease and rapidity.

What I claim as new and of my invention, and desire to secure by Letters Patent, is—

1. The combination, substantially as described, of the cap E, formed with slots $e$, expansible centering-arms F, provided with studs $F^1$, projecting pivot-pins $F^2$, and pressure-springs G, for the purposes set forth.

2. The combination of the supporting-frame A, ring-gear C, having laterally and downwardly projecting annular flanges $C^1$ and $C^2$, and cap-piece E, having downwardly-projecting annular flange $E^2$, substantially as set forth.

3. The shelling-arms D, when constructed with curved convex sides $d$, and studs or projections $D^2$, said arms being pivoted directly to the operating ring-gear C, for combined and uniform action, substantially as set forth.

4. The combination and relative arrangement, substantially as set forth, of the shelling-arms D, ring-gear C, pressure-springs $D^3$, and bearing-studs $g$, said arms being pivoted directly to the lower side of the ring-gear C $C^1$, the springs $D^3$ being directly beneath the arms D, coiled around the arm-pivots or bearing-studs, and pressing against the studs $g$ on the under side of said arms, as herein described, and for the purposes stated.

5. The combination, with the feeding-rolls H, of the arms I J, journaled in projecting bearings $A^3$, pressure-springs N, arranged around said bearings, and pressing against lugs or pins $n$ and $o$, and the stop-pins $i$, fixed to the arm-journals and fitted in recesses in the bearings $A^3$, said parts being constructed and arranged for operation as shown and described.

6. In combination, substantially as described, the driving-gear B, its hub forming a pinion, $B^1$, the intermediate gear K, supported at the exterior of the frame on the arm-journal J, the pinion L, shaft M, supporting-frame A, formed with slot $m$, and feed-roll H, for the purposes set forth.

In witness that I claim the above I have hereunto set my hand this 5th day of April, 1876.

J. EDWIN LEWIS.

Witnesses:
  CHAS. H. BURLEIGH,
  GEO. J. MOWRY.